US011350383B2

(12) United States Patent
Liu

(10) Patent No.: US 11,350,383 B2
(45) Date of Patent: May 31, 2022

(54) PAGING MESSAGE SENDING AND RECEIVING METHOD AND APPARATUS, BASE STATION, AND USER EQUIPMENT

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 157 days.

(21) Appl. No.: 16/803,929

(22) Filed: Feb. 27, 2020

(65) Prior Publication Data
US 2020/0205122 A1 Jun. 25, 2020

Related U.S. Application Data

(63) Continuation of application No. PCT/CN2017/099566, filed on Aug. 30, 2017.

(51) Int. Cl.
H04W 72/04 (2009.01)
H04W 68/00 (2009.01)
H04W 76/11 (2018.01)

(52) U.S. Cl.
CPC ....... H04W 68/005 (2013.01); H04W 72/042 (2013.01); H04W 76/11 (2018.02)

(58) Field of Classification Search
CPC . H04W 68/02; H04W 68/005; H04W 72/042; H04W 72/14; H04W 72/1231; H04W 76/11; H04W 84/045
See application file for complete search history.

(56) References Cited

U.S. PATENT DOCUMENTS

2013/0294318 A1* 11/2013 Amerga ................. H04W 4/06
370/312
2015/0092630 A1 4/2015 Lin et al.
(Continued)

FOREIGN PATENT DOCUMENTS

CN 101601319 A 12/2009
CN 102651853 A 8/2012
(Continued)

OTHER PUBLICATIONS

International Search Report for International Application No. PCT/CN2017/099566 dated Mar. 29, 2018.
(Continued)

Primary Examiner — Wei Zhao
(74) Attorney, Agent, or Firm — Syncoda LLC; Feng Ma

(57) ABSTRACT

A method for sending a paging message includes: determining that a current user equipment (UE) belongs to a first service group or a second service group, if there is a paging request from the current UE; sending a first paging message to all UEs in the first small service group to which the current UE belongs through one of a plurality of first POs according to first configuration information which is pre-generated, if the current UE belongs to the first service group; and carrying a paging indication through one of the plurality of first POs and sending a second paging message to the UE indicated by the paging indication through one second PO according to second configuration information which is pre-generated, if the current UE belongs to the second service group, wherein the paging indication is configured to indicate an identification of all the UEs in the second small service group to which the current UE belongs.

19 Claims, 10 Drawing Sheets

(56) References Cited

U.S. PATENT DOCUMENTS

2017/0127381 A1    5/2017  Yavus et al.
2019/0313437 A1*  10/2019  Jung .................... H04L 5/0042
2020/0008172 A1*   1/2020  Chen ................ H04W 72/1289

FOREIGN PATENT DOCUMENTS

| CN | 102761826 A | 10/2012 |
|----|-------------|---------|
| CN | 102857869 A | 1/2013 |
| CN | 104811960 A | 7/2015 |
| CN | 105792141 A | 7/2016 |
| CN | 106612521 A | 5/2017 |
| EP | 2369883 A1 | 9/2011 |
| WO | 2012125093 A1 | 9/2012 |

OTHER PUBLICATIONS

Partial Supplementary European Search Report for European Application No. 17923618.7 dated Oct. 1, 2020.
CN 1st Office Action in Application No. 201780001382.1, dated Feb. 20, 2021.
India 1st Office Action in Application No. 202027012214, dated Mar. 24, 2021.

* cited by examiner

PAGING MESSAGE SENDING AND RECEIVING METHOD AND APPARATUS, BASE STATION, AND USER EQUIPMENT

CROSS-REFERENCE TO RELATED APPLICATION

This application is a continuation of International Application No. PCT/CN2017/099566 filed on Aug. 30, 2017, the disclosure of which is hereby incorporated by reference in its entirety.

BACKGROUND

With the rapid development of wireless communication technologies, 5th generation mobile communication technology (5G) systems have emerged. The 5G systems will be targeted at high-frequency applications, such as applications at above 6 GHz. In a high-frequency band, because a propagation characteristic of a radio wave may not be idea, traditional omnidirectional transmission will no longer be applicable, and beam scanning and beam management need to be introduced for communications.

SUMMARY

The present disclosure relates generally to the field of communication technologies, and more specifically to a method and device for sending and receiving a paging message, a base station, a user equipment, and a computer-readable storage medium.

According to a first aspect of embodiments of the present disclosure, there is provided a method for sending a paging message, which is applied to a base station, including: determining that a current user equipment UE belongs to a first service group or a second service group, if there is a paging request from the current UE, the first service group including a first large service group or a first small service group, the second service group including a second large service group or a second small service group, the first large service group including at least one of the first small service group, and the second large service group including at least one of the second small service group; sending a first paging message to all UEs in the first small service group to which the current UE belongs through one of a plurality of first paging occasions (POs) according to first configuration information which is pre-generated, if the current UE belongs to the first service group; and carrying a paging indication through one of the plurality of first POs and sending a second paging message to the UE indicated by the paging indication through one second PO according to second configuration information which is pre-generated, if the current UE belongs to the second service group, wherein the paging indication is configured to indicate an identification of all the UEs in the second small service group to which the current UE belongs.

In some embodiments, the method further includes, before the determining that a current user equipment UE belongs to a first service group or a second service group: receiving a first service request sent by the UE, and sending the first service request to a core network; and receiving the identification of the UE belonging to the first large service group returned by the core network according to the first service request, and classifying the identification of the UE not belonging to the first large service group to the second large service group.

In some embodiments, the method further includes, after the classifying the identification of the UE not belonging to the first large service group to the second large service group: dividing the first large service group into at least one of the first small service group, and dividing the second large service group into at least one of the second small service group.

In some embodiments, the method further includes, before the sending a first paging message to all UEs of the first small service group to which the current UE belongs through one of a plurality of first paging occasions (POs) according to first configuration information which is pre-generated: generating the first configuration information and the second configuration information, and sending the first configuration information and the second configuration information to the UE. The first configuration information includes one of the plurality of first POs allocated to the UE belonging to the first service group, and a physical downlink control channel (PDCCH) and a physical downlink shared channel (PDSCH) corresponding to an allocated first PO and being configured to transmit the first paging message. The second configuration information includes the identification of the first PO for carrying the paging indication, the second PO allocated to the UE belonging to the second service group, and the PDCCH and the PDSCH corresponding to the second PO and being configured to transmit the second paging message.

According to a second aspect of embodiments of the present disclosure, there is provided a method for receiving a paging message, which is applied to a user equipment UE, including: determining that a current user equipment UE belongs to a first service group or a second service group, the first service group including a first large service group or a first small service group, and the second service group including a second large service group or a second small service group; analyzing one of a plurality of first paging occasions (POs) according to first configuration information which is pre-received to obtain a first paging message, if the current UE belongs to the first service group; and analyzing second configuration information which is pre-received to obtain a paging indication, and analyzing a second PO to obtain a second paging message when an identification of the current UE is the same as one of the identifications of the UE indicated by the paging indication, if the current UE belongs to the second service group.

In some embodiments, the method further includes: receiving the first configuration information and the second configuration information sent by a base station. The first configuration information includes one of the plurality of first POs allocated to the UE belonging to the first service group, and a physical downlink control channel (PDCCH) and a physical downlink shared channel (PDSCH) corresponding to an allocated first PO and being configured to transmit the first paging message. The second configuration information includes the identification of the first PO for carrying the paging indication, the second PO allocated to the UE belonging to the second service group, and the PDCCH and the PDSCH corresponding to the second PO and being configured to transmit the second paging message.

In some embodiments, the analyzing one of a plurality of first paging occasions (POs) according to first configuration information which is pre-received to obtain a first paging message includes: analyzing the PDCCH, corresponding to the first PO configured by the first configuration information and being configured to transmit the first paging message, to obtain paging control information; and analyzing the PDSCH, corresponding to the first PO configured by the first configuration information and being configured to transmit the first paging message, according to the paging control information to obtain the first paging message.

In some embodiments, the analyzing a second PO to obtain a second paging message includes: analyzing the PDCCH, corresponding to the second PO and being configured to transmit the second paging message, to obtain paging control information; and analyzing the PDSCH, corresponding to the second PO and being configured to transmit the second paging message, according to the paging control information to obtain the second paging message.

According to a third aspect of embodiments of the present disclosure, there is provided a device for sending a paging message, which is applied to a base station, including: a determining module, configured to determine that a current UE belongs to a first service group or a second service group, if there is a paging request from the current UE, the first service group including a first large service group or a first small service group, the second service group including a second large service group or a second small service group, the first large service group including at least one of the first small service group, and the second large service group including at least one of the second small service group; a first sending module, configured to send a first paging message to all UEs in the first small service group to which the current UE belongs through one of a plurality of first paging occasions (POs) according to first configuration information which is pre-generated, if the determining module determines that the current UE belongs to the first service group; and a second sending module, configured to carry a paging indication through one of the plurality of first POs and send a second paging message to the UE indicated by the paging indication through one second PO according to second configuration information which is pre-generated, if the determining module determines that the current UE belongs to the second service group, wherein the paging indication is configured to indicate an identification of all the UEs in the second small service group to which the current UE belongs.

In some embodiments, the device further includes: a forwarding module, configured to receive a first service request sent by the UE, and send the first service request to a core network, before the determining module determines that the current UE belongs to the first service group or the second service group; and a receiving and classifying module, configured to receive the identification of the UE belonging to the first large service group returned by the core network according to the first service request, and classify the identification of the UE not belonging to the first large service group to the second large service group.

In some embodiments, the device further includes: a dividing module, configured to divide the first large service group into at least one of the first small service group, and divide the second large service group into at least one of the second small service group, after the receiving and classifying module classifies the identification of the UE not belonging to the first large service group to the second large service group.

In some embodiments, the device further includes: a generating and sending module, configured to generate the first configuration information and the second configuration information, and send the first configuration information and the second configuration information to the UE, before the first sending module sends the first paging message to all the UEs of the first small service group to which the current UE belongs through one of the plurality of first paging occasions (POs) according to the first configuration information which is pre-generated. The first configuration information includes one of the plurality of first POs allocated to the UE belonging to the first service group, and a physical downlink control channel (PDCCH) and a physical downlink shared channel (PDSCH) corresponding to an allocated first PO and being configured to transmit the first paging message. The second configuration information includes the identification of the first PO for carrying the paging indication, the second PO allocated to the UE belonging to the second service group, and the PDCCH and the PDSCH corresponding to the second PO and being configured to transmit the second paging message.

According to a fourth aspect of embodiments of the present disclosure, there is provided a device for receiving a paging message, which is applied to a user equipment UE, including: a service group determining module, configured to determine that a current UE belongs to a first service group or a second service group, the first service group including a first large service group or a first small service group, and the second service group including a second large service group or a second small service group; a first analyzing module, configured to analyze one of a plurality of first paging occasions (POs) according to first configuration information which is pre-received to obtain a first paging message, if the service group determining module determines that the current UE belongs to the first service group; and a second analyzing module, configured to analyze second configuration information which is pre-received to obtain a paging indication, and analyze a second PO to obtain a second paging message when an identification of the current UE is in the same as the identifications of the UE indicated by the paging indication, if the service group determining module determines that the current UE belongs to the second service group.

In some embodiments, the device further includes: a receiving module, configured to receive the first configuration information and the second configuration information sent by a base station, before the first analyzing module obtains the first paging message through analyzing or the second analyzing module obtains the second paging message through analyzing. The first configuration information includes one of the plurality of first POs allocated to the UE belonging to the first service group, and a physical downlink control channel (PDCCH) and a physical downlink shared channel (PDSCH) corresponding to an allocated first PO and being configured to transmit the first paging message, and the second configuration information includes the identification of the first PO for carrying the paging indication, the second PO allocated to the UE belonging to the second service group, and the PDCCH and the PDSCH corresponding to the second PO and being configured to transmit the second paging message.

In some embodiments, the first analyzing module includes: a first analyzing sub-module, configured to analyze the PDCCH, corresponding to the first PO configured by the first configuration information and being configured to transmit the first paging message, to obtain paging control information; and a second analyzing sub-module, configured to analyze the PDSCH, corresponding to the first PO configured by the first configuration information and being configured to transmit the first paging message, according to the paging control information obtained by the first analyzing sub-module to obtain the first paging message.

In some embodiments, the second analyzing module includes: a third analyzing sub-module, configured to analyze the PDCCH, corresponding to the second PO and being configured to transmit the second paging message, to obtain paging control information; and a fourth analyzing sub-module, configured to analyze the PDSCH, corresponding to the second PO and being configured to transmit the second paging message, according to the paging control information obtained by the third analyzing sub-module to obtain the second paging message.

According to a fifth aspect of embodiments of the present disclosure, there is provided a base station, including: a processor; and a memory having instructions stored thereon, which are executable by the processor. The processor is configured to: determine that a current UE belongs to a first service group or a second service group, if there is a paging request from the current UE, the first service group including a first large service group or a first small service group, the second service group including a second large service group or a second small service group, the first large service group including at least one of the first small service group, and the second large service group including at least one of the second small service group; send a first paging message to all UEs in the first small service group to which the current UE belongs through one of a plurality of first paging occasions (POs) according to first configuration information which is pre-generated, if the current UE belongs to the first service group; and carry a paging indication through one of the plurality of first POs and send a second paging message to the UE indicated by the paging indication through one second PO according to second configuration information which is pre-generated, if the current UE belongs to the second service group, wherein the paging indication is configured to indicate an identification of all the UEs in the second small service group to which the current UE belongs.

According to a sixth aspect of embodiments of the present disclosure, there is provided a user equipment, including: a processor; and a memory having instructions stored thereon, which are executable by the processor. The processor is configured to: determine that a current UE belongs to a first service group or a second service group, the first service group including a first large service group or a first small service group, and the second service group including a second large service group or a second small service group; analyze one of a plurality of first paging occasions (POs) according to first configuration information which is pre-received to obtain a first paging message, if the current UE belongs to the first service group; and analyze second configuration information which is pre-received to obtain a paging indication, and analyze a second PO to obtain a second paging message when an identification of the current UE is in the same as the identifications of the UE indicated by the paging indication, if the current UE belongs to the second service group.

According to a seventh aspect of embodiments of the present disclosure, there is provided a computer-readable storage medium, having computer programs stored thereon. When the computer programs are executed by a processor, steps in the method for sending a paging message according to claim 1 are implemented.

According to an eighth aspect of embodiments of the present disclosure, there is provided a computer-readable storage medium, having computer programs stored thereon. When the computer programs are executed by a processor, steps in the method for receiving a paging message according to claim 5 are implemented.

It is to be understood that both the foregoing general description and the following detailed description are exemplary and explanatory only and are not restrictive of the present disclosure.

BRIEF DESCRIPTION OF THE DRAWINGS

The accompanying drawings herein which are incorporated into and constitute part of the description, illustrate embodiments according to the present disclosure, and serve to explain principles of the present disclosure together with the description.

DETAILED DESCRIPTION

Figure 1:
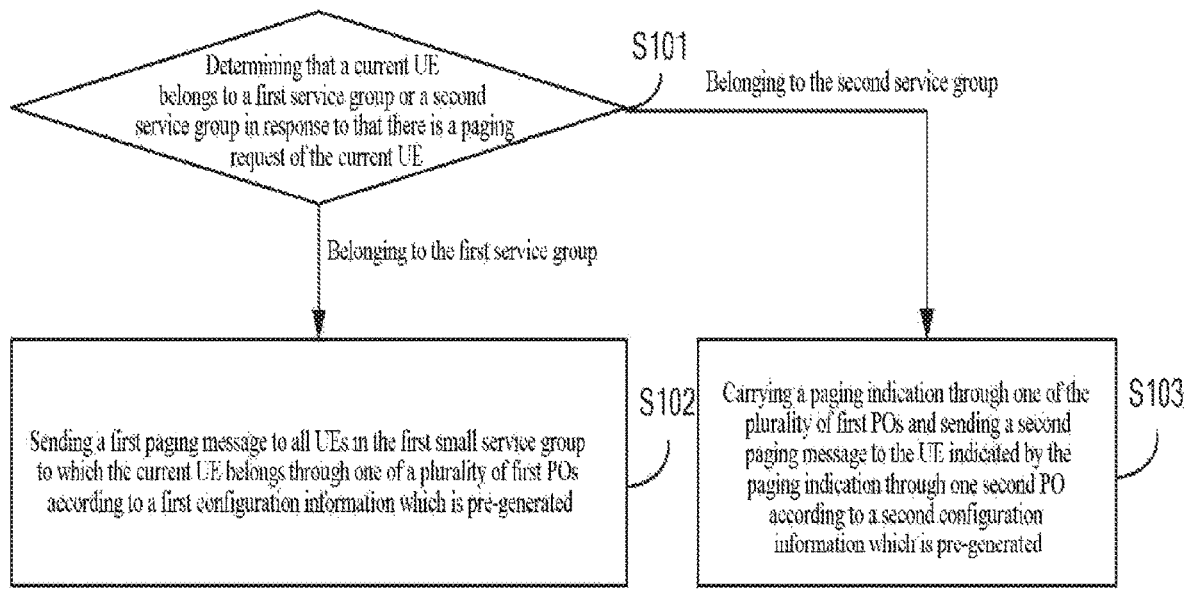
FIG. 1 is a flowchart of a method for sending a paging message according to some embodiments of the present application.

Exemplary embodiments will be described in detail herein, examples of which are illustrated in the accompanying drawings. When the following description refers to the accompanying drawings, the same reference numerals in different drawings represent the same or similar elements unless otherwise indicated. The implementations described in the following exemplary embodiments do not represent all implementations consistent with the present disclosure. Rather, they are merely examples of devices and methods consistent with some aspects of the present disclosure as detailed in the appended claims.

There are different types of user equipment (UE) in the 5G system. One important type is low-latency UEs. Such UEs have high requirements on latency and shall not consume too much power. A main function of paging is to notify the UE in an idle state of a connection request, and to notify the UE in the idle and connected state of that a system message has changed. A paging message is mapped to a physical downlink shared channel (PDSCH), and the UE may obtain the paging message by monitoring a physical downlink control channel (PDCCH) of the PDSCH. When the UE monitors that the PDCCH has paging scheduling, it receives the PDSCH according to the PDCCH information, thereby obtaining paging information.

In the 5G system, when the paging message is sent on multiple beams, it is a waste of resources. In the related art, a paging indication (PI) is sent to notify one or more groups of a paging arrival, and the notified one or more groups of UEs monitor corresponding PDCCH and PDSCH to obtain the paging message. However, generally, most groups have at least one UE that has paging, that is, most groups need to monitor the paging message, which is still a waste of resources.

FIG. 1 is a flowchart of a method for sending a paging message according to some embodiments of the present application. This embodiment is described from a base station side. As shown in FIG. 1, the method for sending a paging message includes the following steps.

In step S101, if there is a paging request from a current UE, it is determined that the current UE belongs to a first service group or a second service group. If the current UE belongs to the first service group, step S102 is performed; and if the current UE belongs to the second service group, step S103 is performed.

The first service group includes a first large service group or a first small service group, and the second service group includes a second large service group or a second small service group.

In the embodiments, a first service refers to a low-latency service. A UE belonging to a low-latency large or small service group may include, but is not limited to, the UE requesting service such as ultra-reliable low-latency communication (URLLC), augmented reality (AR), or virtual reality (VR), and may also include the UE with a subscriber identification module (SIM) card. A second service refers to a non-low-latency service.

In step S102, a first paging message is sent to all UEs in the first small service group to which the current UE belongs through one of a plurality of first POs according to first configuration information which is pre-generated.

Figure 2:
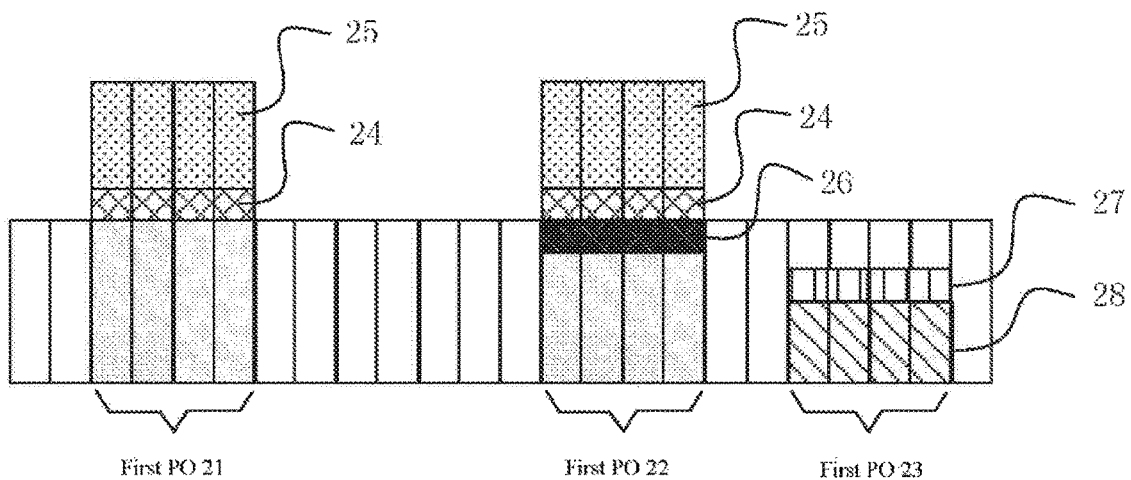
FIG. 2 is a schematic diagram illustrating a plurality of first POs allocated to a UE belonging to a first service group and a second PO allocated to the UE belonging to a second service group according to some embodiments of the present application.

In order to reduce waste of resources and at the same time to reduce effect on the low-latency service, in the embodiments, a plurality of first POs may be provided for the low-latency UE in each cycle, and one second PO is provided for the non-low-latency UE. For example, as shown in FIG. 2, two first POs are provided for the low-latency UE in each cycle, and the two first POs are referred to as a first PO 21 and a first PO 22 respectively for distinction, and one second PO 23 is provided for the non-low-latency UE.

The first configuration information includes one of the plurality of first POs allocated to the UE belonging to the first service group, and a PDCCH and a PDSCH corresponding to an allocated first PO and being configured to transmit the first paging message. For example, as shown in FIG. 2, the one first PO allocated to a UE1 assumed as the UE of the first service group is a first PO 21, the PDCCH corresponding to the first PO 21 and being configured to transmit the first paging message is PDCCH 24, and the PDSCH corresponding to the first PO 21 and being configured to transmit the first paging message is PDSCH 25.

In the embodiments, when the first service group is the first large service group, the base station may reduce resource consumption by sending the first paging message to all UEs of the first small service group to which the current UE belongs. When the first service group is the first small service group, the base station may reduce the resource consumption by sending the first paging message to all the UEs of the first small service group to which the current UE belongs. For example, if the first large service group includes 10 first small service groups, and each of the first small service groups includes 3 UEs, the base station only needs to send the first paging message to the 3 UEs in the first small service group where the current UE is located, and needs not to send the first paging message to all the UEs (i.e., the 30 UEs) in the first large service group, thereby reducing the resource consumption.

In step S103, according to second configuration information which is pre-generated, a paging indication is carried through one of the plurality of first POs and a second paging message is sent to the UE indicated by the paging indication through one second PO. The paging indication is configured to indicate an identification of all the UEs in the second small service group to which the current UE belongs.

The second configuration information includes the identification of the first PO for carrying the paging indication, the second PO allocated to the UE belonging to the second service group, and the PDCCH and the PDSCH corresponding to the second PO and being configured to transmit the second paging message. For example, as shown in FIG. 2, the first PO for carrying the paging indication 26 is the first PO 22, the second PO allocated to a UE 3 assumed as the UE belonging to the second service group is the second PO 23, the PDCCH corresponding to the second PO 23 and being configured to transmit the second paging message is PDCCH 27, and the PDSCH corresponding to the second PO 23 and being configured to transmit the second paging message is PDSCH 28.

In the embodiments, when the second service group is the second large service group, the paging indication may be used to indicate the identification of all the UEs in the second small service group to which the current UE belongs. When the second service group is the second small service group, the paging indication may be used to indicate the identification of all the UEs in the second small service group to which the current UE belongs, that is, the paging indication is used to notify all the UEs in the second small service group to which the current UE belongs to analyze the second PO, instead of notifying all the UEs belonging to the second large service group to analyze the second PO, which can effectively save resources.

It should be noted that the first PO for carrying the paging indication and the first PO for sending the first paging message in step S102 are not necessarily the same.

In the above embodiments, by sending a first paging message to all UEs in a first small service group to which a current UE belongs through one of a plurality of first paging occasions (POs) according to first configuration information which is pre-generated, and carrying a paging indication through one of the plurality of first POs and sending a second paging message to the UE indicated by the paging indication through one second PO according to second configuration information which is pre-generated, both a low low-latency paging requirement of a low-latency UE and a paging requirement of a non-low-latency UE can be satisfied, and resources can be saved effectively.

Figure 3A:
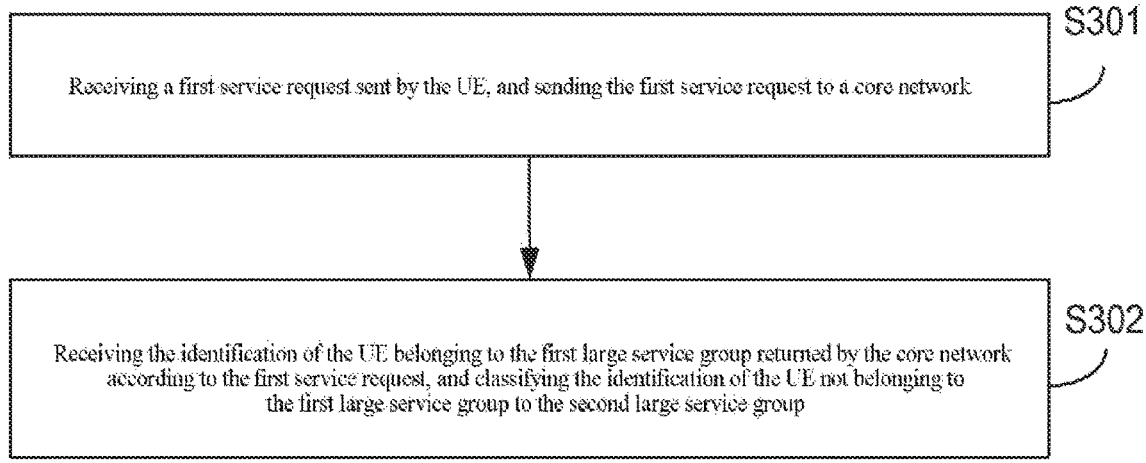
FIG. 3A is a flowchart of another method for sending a paging message according to some embodiments of the present application.

FIG. 3A is a flowchart illustrating another method for sending a paging message according to some embodiments of the present application. As shown in FIG. 3A, before the above step S101, the method for sending a paging message may further include the following steps.

In step S301, a first service request sent by the UE is received, and the first service request is sent to a core network.

In the embodiments, the base station may receive the first service request sent by the UE and send the first service request to the core network. The first service may include, but is not limited to, services such as URLLC, AR, or VR.

In step S302, the identification of the UE belonging to the first large service group returned by the core network according to the first service request is received, and the identification of the UE not belonging to the first large service group is classified to the second large service group.

After receiving the first service request from a plurality of UEs, the core network may classify all the UEs requesting the first service to a first large service group, and return the identification of the UEs belonging to the first large service group to the base station. At the same time, the identification of the UEs not belonging to the first large service group may be classified to the second large service group.

In the above embodiments, by receiving the first service request sent by the UE, and sending the first service request to the core network, and then receiving the identification of the UE belonging to the first large service group returned by the core network according to the first service request, and classifying the identification of the UE not belonging to the first large service group to the second large service group, a condition under which a paging message is sent subsequently according to the first large service group or the second large service group is provided.

Figure 3B:
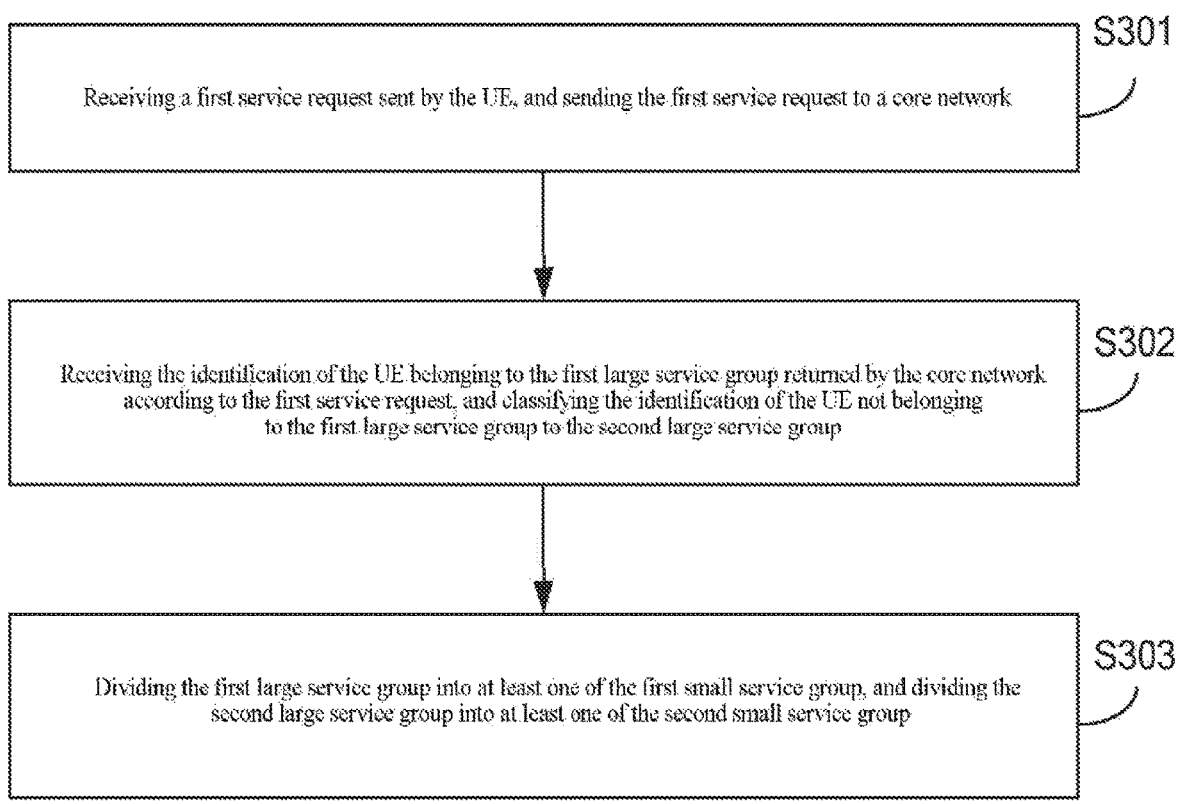
FIG. 3B is a flowchart of another method for sending a paging message according to some embodiments of the present application.

FIG. 3B is a flowchart of another method for sending a paging message according to some embodiments of the present application. As shown in FIG. 3B, after the above step S302, the method for sending a paging message may further include the following steps.

In step S303, the first large service group is divided into at least one first small service group, and the second large service group is divided into at least one second small service group.

In the above embodiments, the first large service group is divided into at least one first small service group, and the second large service group is divided into at least one second small service group, such that the number of UEs included in the first or second small service group is smaller, thereby providing a condition for subsequently sending a paging messages according to the first or second small service group to which the UE belongs.

Figure 3C:
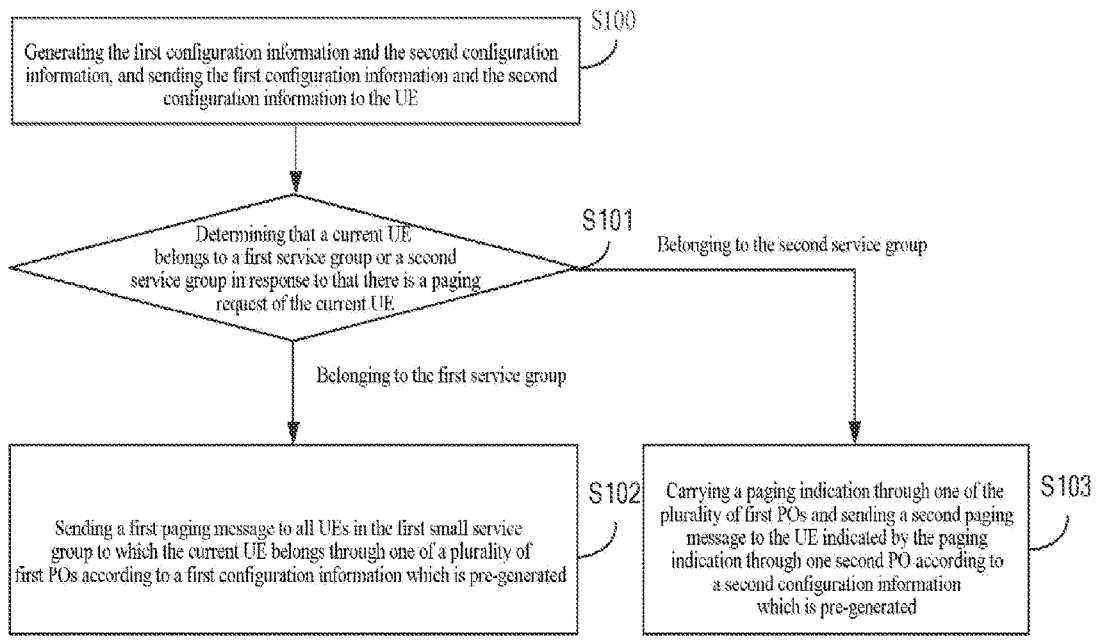
FIG. 3C is a flowchart of another method for sending a paging message according to some embodiments of the present application.

FIG. 3C is a flowchart of another method for sending a paging message according to some embodiments of the present application. As shown in FIG. 3C, before the above step S101, the method for sending a paging message may further include the followings steps.

In step S100, the first configuration information and the second configuration information are generated, and the first configuration information and the second configuration information are sent to the UE.

In the embodiments, the base station may generate the first configuration information and the second configuration information, thereby providing a condition for subsequently sending the first paging message according to the first configuration information and sending the second paging message according to the second configuration information.

In the above embodiments, by generating the first and second configuration information, a condition for subsequently sending the first paging message according to the first configuration information and sending the second paging message according to the second configuration information is provided.

Figure 4:
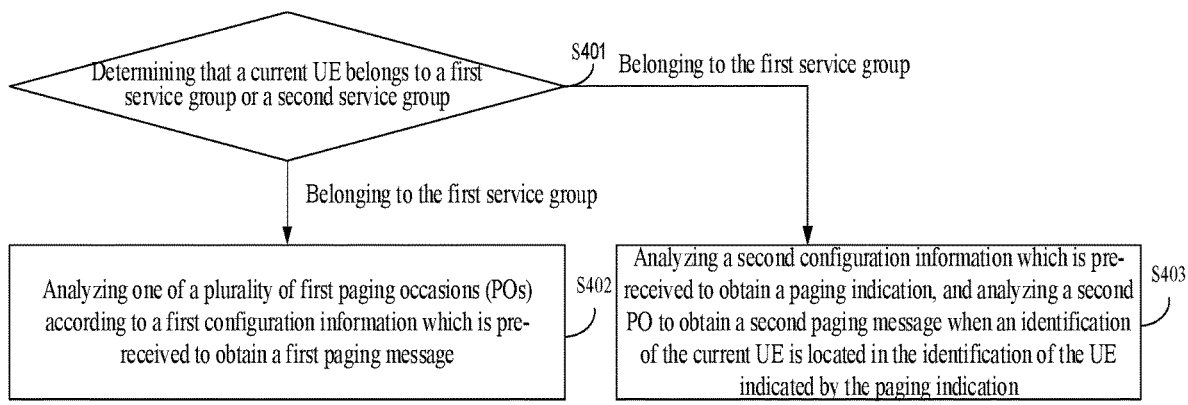
FIG. 4 is a flowchart of a method for receiving a paging message according to some embodiments of the present application.

FIG. 4 is a flowchart illustrating a method for receiving a paging message according to some embodiments of the present application. This embodiment is described from a UE side. As shown in FIG. 4, the method for receiving a paging message includes the following steps.

In step S401, it is determined that a current UE belongs to a first service group or a second service group. If the current UE belongs to the first service group, step S402 is performed, and if the current UE does not belong to the first service group, step S403 is performed.

The first service group includes a first large service group or a first small service group, and the second service group includes a second large service group or a second small service group.

In the embodiments, a first service refers to a low-latency service. The UE belonging to the first service group may include, but is not limited to, the UE requesting services such as URLLC, AR, or VR, and may also include the UE with a subscriber identification module (SIM) card. A second service refers to a non-low-latency service.

In step S402, one of a plurality of first paging occasions POs is analyzed according to first configuration information which is pre-received to obtain a first paging message.

In the embodiments, the analyzing one of a plurality of first paging occasions (POs) according a first configuration information which is pre-received to obtain a first paging message includes: analyzing the PDCCH, corresponding to the first PO configured by the first configuration information and being configured to transmit the first paging message, to obtain paging control information; and analyzing the PDSCH, corresponding to the first PO configured by the first configuration information and being configured to transmit the first paging message, according to the paging control information to obtain the first paging message.

For example, the UE may analyze the PDCCH 24 corresponding to the first PO 21 in FIG. 2 to obtain the paging control information, and then analyze the PDSCH 25, corresponding to the first PO 21 in FIG. 2 and being configured to transmit the first paging message, according to the paging control information to obtain the first paging message.

It can be seen that the implementation of obtaining the first paging message through the above analyzing is relatively simple.

In step S403, second configuration information which is pre-received is analyzed to obtain a paging indication, and a second PO is analyzed to obtain a second paging message when an identification of the current UE is located in the identifications of the UE indicated by the paging indication, that is, the identification of the current UE is the same as one of the identifications of the UE indicated by the paging indication.

In the embodiments, the analyzing a second PO to obtain a second paging message may include: analyzing the PDCCH, corresponding to the second PO and being configured to transmit the second paging message, to obtain paging control information; and then analyzing the PDSCH, corresponding to the second PO and being configured to transmit the second paging message, according to the paging control information to obtain the second paging message.

For example, the PDCCH 27 corresponding to the second PO 23 in FIG. 2 and being configured to transmit the second paging message is analyzed to obtain the paging control information, and then the PDSCH 28 corresponding to the second PO 23 and being configured to transmit the second paging message is analyzed according to the paging control information to obtain the second paging message.

It can be seen that the implementation of obtaining the second paging message by the above analyzing is relatively simple.

In the above embodiments, when the current UE belongs to a first service group, one of a plurality of first paging occasions POs is analyzed according to first configuration information which is pre-received to obtain a first paging message; and when the current UE does not belong to the first service group, second configuration information which is pre-received is analyzed to obtain a paging indication and a second PO is analyzed to obtain a second paging message when an identification of the current UE is located in the identification of the UE indicated by the paging indication, that is, the identification of the current UE is the same as one of the identifications of the UE indicated by the paging indication, which can save resources effectively.

Figure 5:
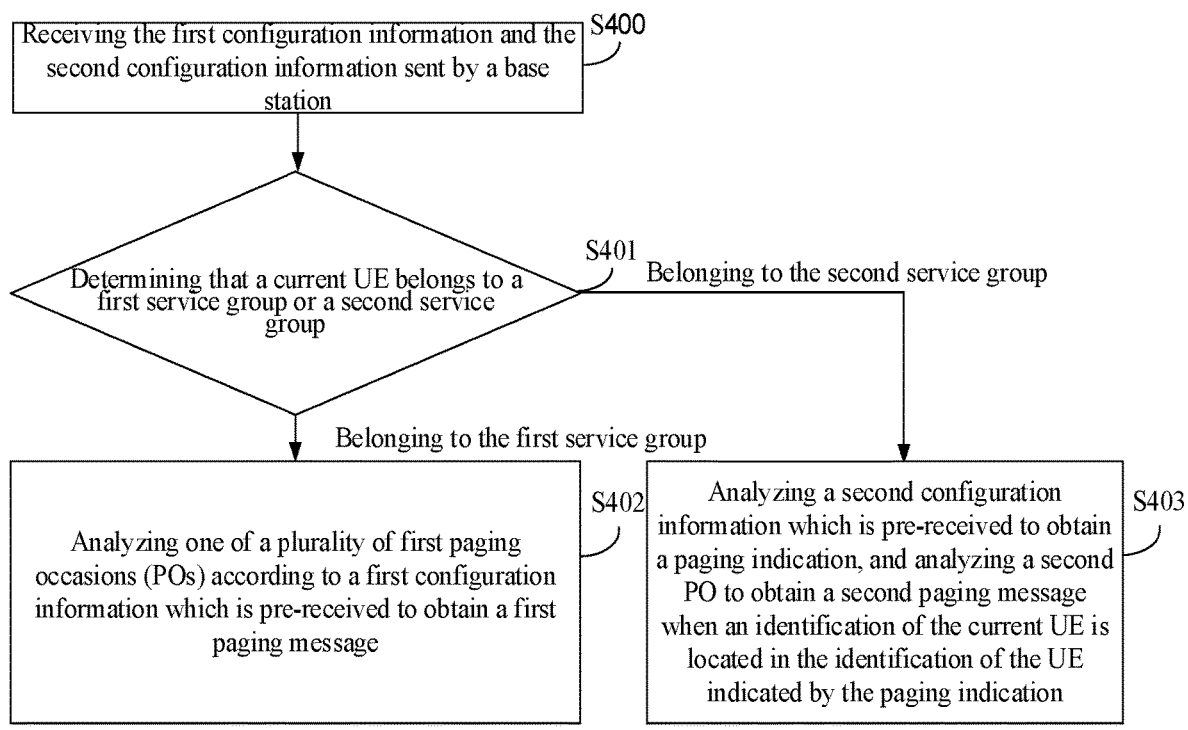
FIG. 5 is a flowchart of another method for receiving a paging message according to some embodiments of the present application.

FIG. 5 is a flowchart illustrating another method for receiving a paging message according to some embodiments of the present application. As shown in FIG. 5, before the above step S402, the method for receiving a paging message may further include the following steps.

In step S400, the first configuration information and the second configuration information sent by a base station are received.

In order to obtain the paging message, the UE may receive the first configuration information and the second configuration information sent by the base station.

The first configuration information includes one of the plurality of first POs allocated to the UE belonging to the first service group, and a PDCCH and PDSCH corresponding to an allocated first PO and being configured to transmit the first paging message. The second configuration information includes the identification of the first PO for carrying the paging indication, the second PO allocated to the UE belonging to the second service group, and the PDCCH and the PDSCH corresponding to the second PO and being configured to transmit the second paging message.

In the above embodiments, by receiving the first configuration information and the second configuration information sent by the base station, a condition for subsequently obtaining the first paging message according to the first configuration information and obtaining the second paging message according to the second configuration is provided.

Figure 6:
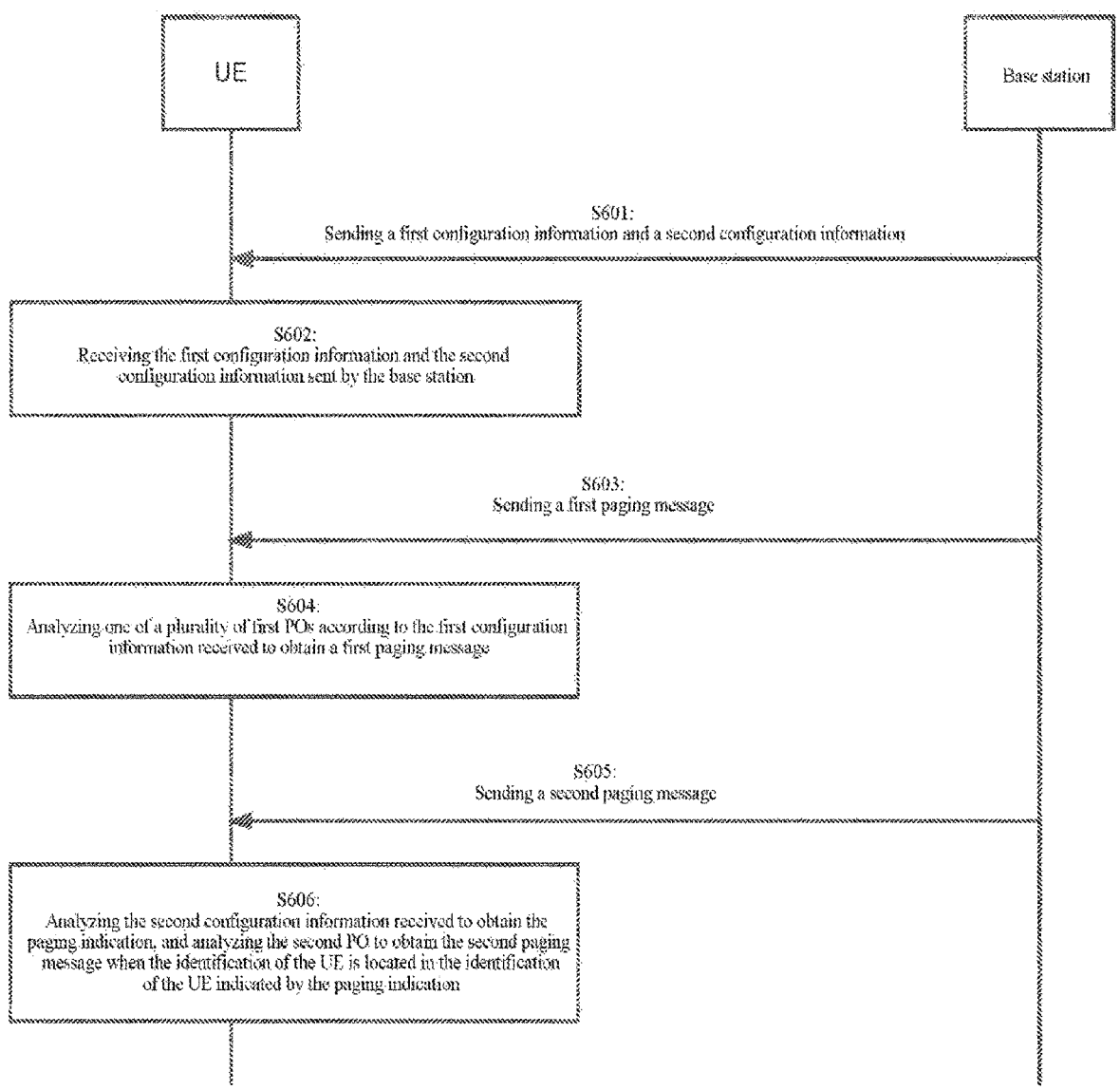
FIG. 6 is a signaling flowchart of a method for receiving a paging message according to some embodiments of the present application.

FIG. 6 is a signaling flowchart of a method for sending and receiving a paging message according to some embodiments of the present application. This embodiment is described from the perspective of interaction between a UE and a base station. As shown in FIG. 6, the method for sending and receiving a paging method includes the following steps.

In step S601, the base station generates first configuration information and second configuration information, and sends the first configuration information and the second configuration information to the UE.

In step S602, the UE receives the first configuration information and the second configuration information sent by the base station.

In step S603, if there is a paging request from the UE and the UE belongs to the first small service group, the base station sends a first paging message to all UEs in the first small service group to which the current UE belongs through one of a plurality of first POs according to the first configuration information.

In step S604, the UE analyzes one of a plurality of first POs according to the first configuration information received to obtain the first paging message.

In step S605, if there is the paging request from the UE and the UE belongs to the second small service group, the base station carries a paging indication through one of the plurality of first POs and sends a second paging message to the UE indicated by the paging indication through one second PO, according to the second configuration information. The paging indication is configured to indicate an identification of all the UEs in the second small service group to which the current UE belongs.

In step S606, the UE analyzes the second configuration information received to obtain the paging indication, and analyzes the second PO to obtain the second paging message when the identification of the UE is located in the identifications of the UE indicated by the paging indication, that is, the identification of the current UE is the same as one of the identifications of the UE indicated by the paging indication.

In the above embodiments, through the interaction between the base station and the UE, the base station may send a first paging message to all UEs in a first small service group to which a current UE belongs through one of a plurality of first POs according to first configuration information which is pre-generated, and carry a paging indication through one of the plurality of first POs and send a second paging message to the UE indicated by the paging indication through one second PO according to second configuration information which is pre-generated, and at the same time, the UE may also analyze one of the plurality of first POs according to the first configuration information to obtain the first paging message, analyze the second configuration information which is pre-received to obtain the paging indication and analyze the second PO to obtain the second paging message when the identification of the current UE is located in the identifications of the UE indicated by the paging indication, that is, the identification of the current UE is the same as one of the identifications of the UE indicated by the paging indication, so that the sending and receiving of the paging message is implemented and the resources may be saved.

Figure 7:
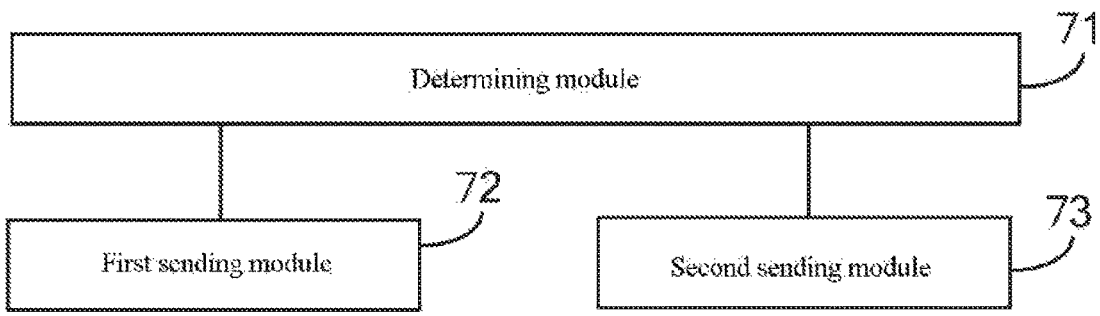
FIG. 7 is a block diagram of a device for sending a paging message according to some embodiments.

FIG. 7 is a block diagram of a device for sending a paging message according to some embodiments. This device may be located in a base station, and as shown in FIG. 7, the device for sending a paging message includes a determining module 71, a first sending module 72 and a second sending module 73.

The determining module 71 is configured to determine that a current UE belongs to a first service group or a second service group, if there is a paging request from the current UE. The first service group includes a first large service group or a first small service group, and the second service group includes a second large service group or a second small service group.

In the embodiments, a first service refers to a low-latency service. The UE belonging to the first service group may include, but is not limited to, the UE requesting service such as URLLC, AR, or VR, and may also include the UE with a subscriber identification module (SIM) card. A second service refers to a non-low-latency service.

The first sending module 72 is configured to send a first paging message to all UEs in the first small service group to which the current UE belongs through one of a plurality of first paging occasions (POs) according to first configuration information which is pre-generated, if the determining module 71 determines that the current UE belongs to the first service group.

In order to reduce waste of resources and at the same time to reduce effect on the low-latency service, in the embodiments, a plurality of first POs may be provided for the low-latency UE in each cycle, and one second PO is provided for the non-low-latency UE. For example, as shown in FIG. 2, two first POs are provided for the low-latency UE in each cycle, and the two first POs are referred to as a first PO 21 and a first PO 22 respectively for distinction, and one second PO 23 is provided for the non-low-latency UE.

The first configuration information includes one of the plurality of first POs allocated to the UE belonging to the first service group, and a PDCCH and PDSCH corresponding to an allocated first PO and being configured to transmit the first paging message. For example, as shown in FIG. 2, the one first PO allocated to a UE1 assumed as the UE of the first service group is a first PO 21, the PDCCH corresponding to the first PO 21 and being configured to transmit the first paging message is PDCCH 24, and the PDSCH corresponding to the first PO 21 and being configured to transmit the first paging message is PDSCH 25.

Preferably, in the embodiments, the resource consumption may be reduced by sending the first paging message to all UEs of the first small service group to which the current UE belongs.

For example, if the first large service group includes 10 first small service groups, and each of the first small service groups includes 3 UEs, the base station only needs to send the first paging message to the 3 UEs in the first small service group where the current UE is located, and needs not to send the first paging message to all the UEs (i.e., the 30 UEs) in the first large service group, thereby reducing the resource consumption.

The second sending module 73 is configured to carry a paging indication through one of the plurality of first POs and send a second paging message to the UE indicated by the paging indication through one second PO according to second configuration information which is pre-generated, if the determining module 71 determines that the current UE belongs to the second service group. The paging indication is configured to indicate an identification of all the UEs in the second small service group to which the current UE belongs.

The second configuration information includes the identification of the first PO for carrying the paging indication, the second PO allocated to the UE belonging to the second service group, and the PDCCH and the PDSCH corresponding to the second PO and being configured to transmit the second paging message. For example, as shown in FIG. 2, the first PO for carrying the paging indication 26 is the first PO 22, the second PO allocated to a UE 3 assumed as the UE belonging to the second service group is the second PO 23, the PDCCH corresponding to the second PO 23 and being configured to transmit the second paging message is PDCCH 27, and the PDSCH corresponding to the second PO 23 and being configured to transmit the second paging message is PDSCH 28.

In the embodiments, when the second service group is the second large service group, the paging indication may be used to indicate the identification of one ore more UEs in the second large service group. When the second service group is the second small service group, the paging indication may be used to indicate the identification of all the UEs in the second small service group to which the current UE belongs, that is, the paging indication is used to notify all the UEs in the second service group to which the current UE belongs to analyze the second PO, instead of notifying all the UEs belonging to the second large service group to analyze the second PO, which can effectively save resources.

It should be noted that the first PO for carrying the paging indication and the first PO for sending the first paging message in step S102 are not necessarily the same.

In the above embodiments, by sending a first paging message to all UEs in a first small service group to which a current UE belongs through one of a plurality of first paging occasions (POs) according to first configuration information which is pre-generated, and carrying a paging indication through one of the plurality of first POs and sending a second paging message to the UE indicated by the paging indication through one second PO according to second configuration information which is pre-generated, both a low low-latency paging requirement of a low-latency UE and a paging requirement of a non-low-latency UE can be satisfied, and resources can be saved effectively.

Figure 8A:
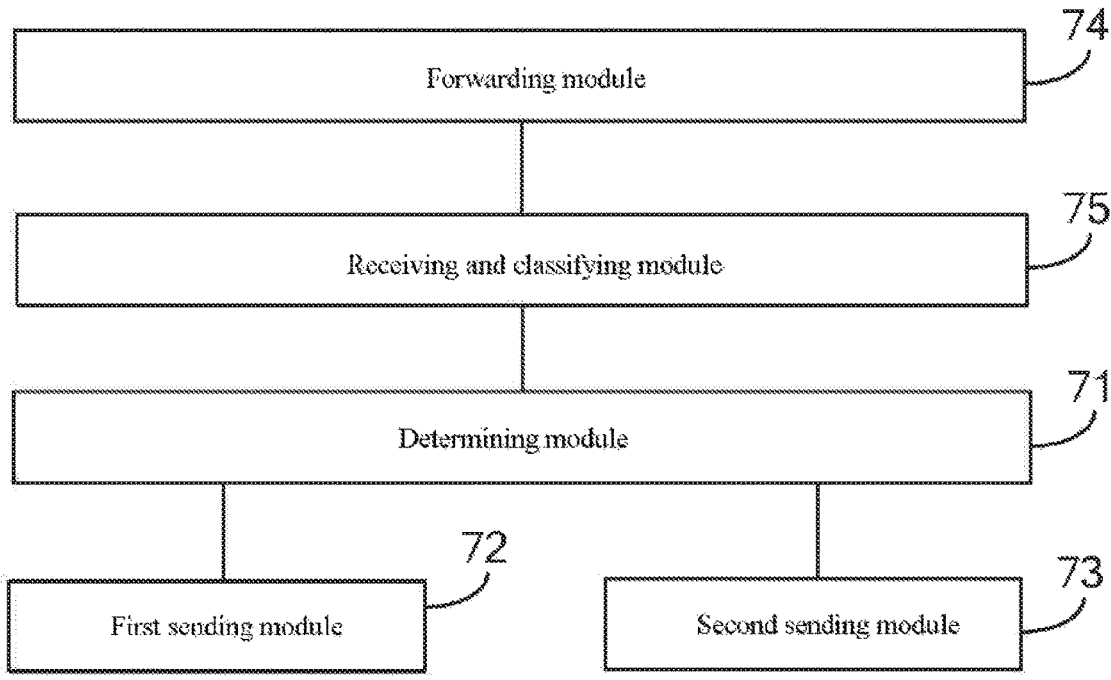
FIG. 8A is a block diagram of another device for sending a paging message according to some embodiments.

FIG. 8A is a block diagram of another device for sending a paging message according to some embodiments. As shown in FIG. 8A, on the basis of the above embodiment shown in FIG. 7, the device may further include a forwarding module 74 and a receiving and classifying module 75.

The forwarding module 74 is configured to receive a first service request sent by the UE, and send the first service request to a core network, before the determining module 71 determines that the current UE belongs to the first service group or the second service group.

In the embodiments, the base station may receive the first service request sent by the UE and send the first service request to the core network. The first service may include, but is not limited to, services such as URLLC, AR, or VR.

The receiving and classifying module 75 is configured to receive the identification of the UE belonging to the first large service group returned by the core network according to the first service request, and classify the identification of the UE not belonging to the first large service group to the second large service group.

After receiving the first service request from a plurality of UEs, the core network may classify all the UEs requesting the first service to a first large service group, and return the identification of the UEs belonging to the first large service group to the base station. At the same time, the identification of the UEs not belonging to the first large service group may be classified to the second large service group.

In the above embodiments, by receiving the first service request sent by the UE, and sending the first service request to the core network, and then receiving the identification of the UE belonging to the first large service group returned by the core network according to the first service request, and classifying the identification of the UE not belonging to the first large service group to the second large service group, a condition under which a paging message is sent subsequently according to the first large service group or the second large service group is provided.

Figure 8B:
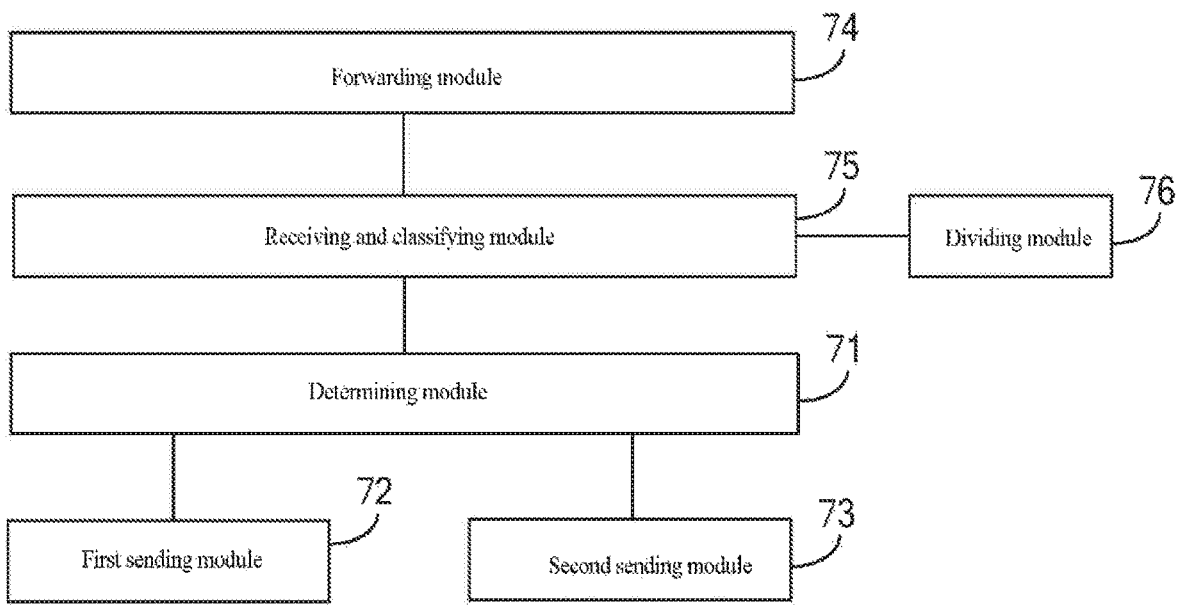
FIG. 8B is a block diagram of another device for sending a paging message according to some embodiments.

FIG. 8B is a block diagram of another device for sending a paging message according to some embodiments. As shown in FIG. 8B, on the basis of the above embodiment shown in FIG. 8A, the device may further include a dividing module 76.

The dividing module 76 is configured to divide the first large service group into at least one first small service group, and divide the second large service group into at least one of the second small service group, after the receiving and classifying module 75 classifies the identification of the UE not belonging to the first large service group to the second large service group.

In the above embodiments, the first large service group is divided into at least one first small service group, and the second large service group is divided into at least one second small service group, such that the number of UEs included in the first or second small service group is smaller, thereby providing a condition for subsequently sending a paging messages according to the first or second small service group to which the UE belongs.

Figure 8C:
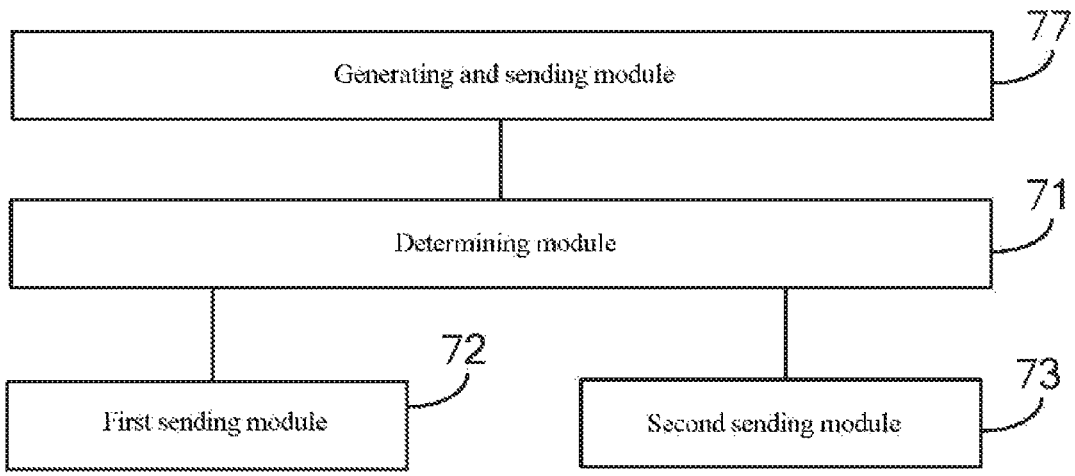
FIG. 8C is a block diagram of another device for sending a paging message according to some embodiments.

FIG. 8C is a block diagram of another device for sending a paging message according to some embodiments. As shown in FIG. 8C, on the basis of the above embodiment shown in FIG. 7, the device may further include a generating and sending module 77.

The generating and sending module 77 is configured to generate the first configuration information and the second configuration information, and send the first configuration information and the second configuration information to the UE, before the first sending module 72 sends the first paging message to all the UEs of the first small service group to which the current UE belongs through one of the plurality of first paging occasions (POs) according to the first configuration information which is pre-generated.

The first configuration information includes one of the plurality of first POs allocated to the UE belonging to the first service group, and a physical downlink control channel (PDCCH) and a physical downlink shared channel (PDSCH) corresponding to an allocated first PO and being configured to transmit the first paging message. The second configuration information includes the identification of the first PO for carrying the paging indication, the second PO allocated to the UE belonging to the second service group, and the PDCCH and the PDSCH corresponding to the second PO and being configured to transmit the second paging message.

In the embodiments, the base station may generate the first and second configuration information, to provide a condition for subsequently sending the first paging message according to the first configuration information and sending the second paging message according to the second configuration information.

In the above embodiments, by generating the first and second configuration information, a condition for subsequently sending the first paging message according to the first configuration information and sending the second paging message according to the second configuration information is provided.

Figure 9:
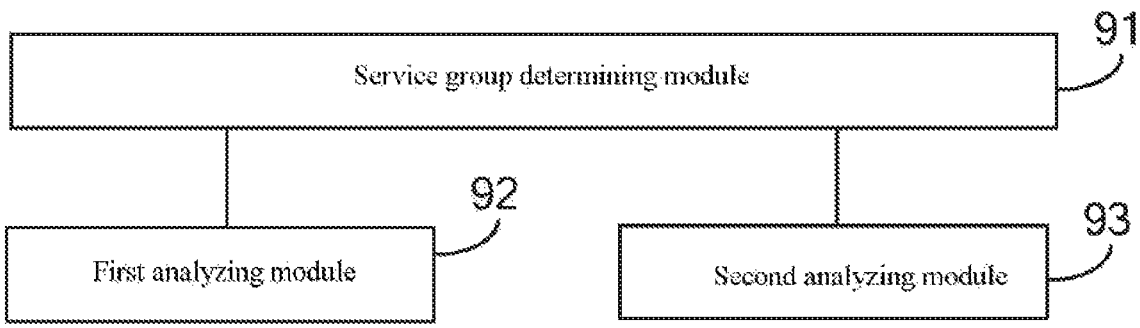
FIG. 9 is a block diagram of a device for receiving a paging message according to some embodiments.

FIG. 9 is a block diagram of a device for receiving a paging message according to some embodiments. The device may be located in a UE, and as shown in FIG. 9, the device for receiving a paging message include a service group determining module 91, a first analyzing module 92 and a second analyzing module 93.

The service group determining module 91 is configured to determine that a current UE belongs to a first service group or a second service group. The first service group includes a first large service group or a first small service group, and the second service group includes a second large service group or a second small service group.

The first service group includes a first large service group or a first small service group, and the second service group includes a second large service group or a second small service group.

In the embodiments, a first service refers to a low-latency service. The UE belonging to the first service group may include, but is not limited to, the UE requesting services such as URLLC, AR, or VR, and may also include the UE with a subscriber identification module (SIM) card. A second service refers to a non-low-latency service.

The first analyzing module 92 is configured to analyze one of a plurality of first paging occasions (POs) according to first configuration information which is pre-received to obtain a first paging message, if the service group determining module 91 determines that the current UE belongs to the first service group.

The second analyzing module 93 is configured to analyze second configuration information which is pre-received to obtain a paging indication, and analyze a second PO to obtain a second paging message when an identification of the current UE is located in the identifications of the UE indicated by the paging indication, that is, the identification of the current UE is the same as one of the identifications of the UE indicated by the paging indication, if the service group determining module 91 determines that the current UE belongs to the second service group.

In the above embodiments, when the current UE belongs to a first service group, one of a plurality of first paging occasions (POs) is analyzed according to first configuration information which is pre-received to obtain a first paging message; and when the current UE does not belong to the first service group, second configuration information which is pre-received is analyzed to obtain a paging indication and a second PO is analyzed to obtain a second paging message when an identification of the current UE is located in the identifications of the UE indicated by the paging indication, that is, the identification of the current UE is the same as one of the identifications of the UE indicated by the paging indication, which can save resources effectively.

Figure 10A:
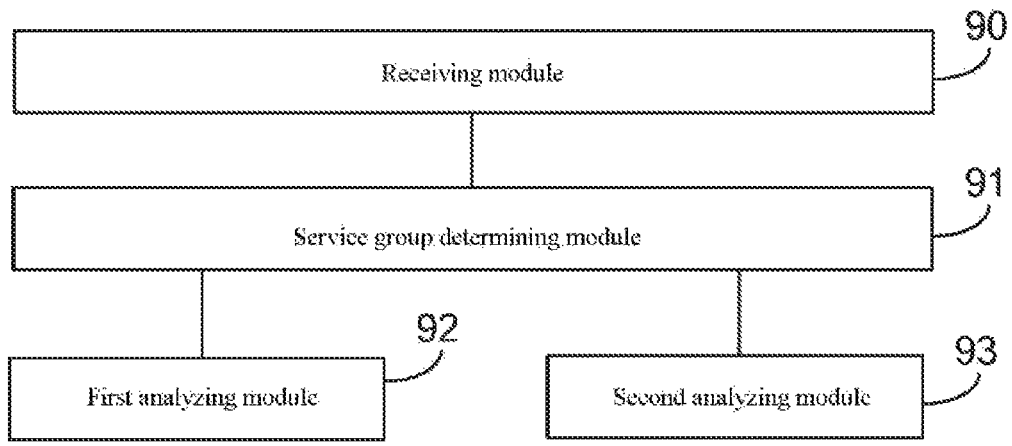
FIG. 10A is a block diagram of another device for receiving a paging message according to some embodiments.

FIG. 10A is a block diagram of another device for receiving a paging message according to some embodiments. As shown in FIG. 10A, on the basis of the above embodiment shown in FIG. 9, the device may further include a receiving module 90.

The receiving module 90 is configured to receive the first configuration information and the second configuration information sent by a base station, before the first analyzing module 92 obtains the first paging message through analyzing or the second analyzing module obtains the second paging message through analyzing.

In order to obtain the paging message, the UE may receive the first configuration information and the second configuration information sent by the base station.

The first configuration information includes one of the plurality of first POs allocated to the UE belonging to the first service group, and a PDCCH and PDSCH corresponding to an allocated first PO and being configured to transmit the first paging message. The second configuration information includes the identification of the first PO for carrying the paging indication, the second PO allocated to the UE belonging to the second service group, and the PDCCH and the PDSCH corresponding to the second PO and being configured to transmit the second paging message.

In the above embodiments, by receiving the first configuration information and the second configuration information sent by the base station, a condition for subsequently obtaining the first paging message according to the first configuration information and obtaining the second paging message according to the second configuration is provided.

Figure 10B:
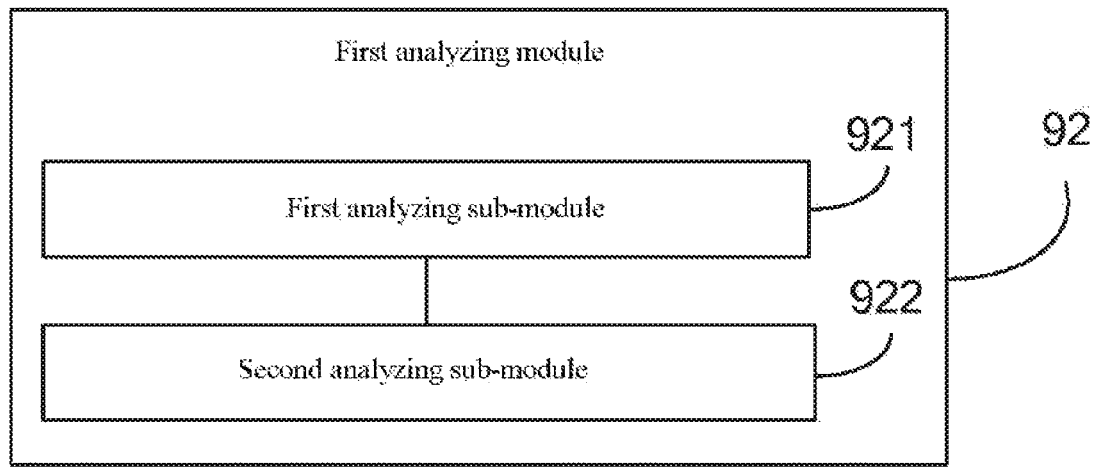
FIG. 10B is a block diagram of another device for receiving a paging message according to some embodiments.

FIG. 10B is a block diagram of another device for receiving a paging message according to some embodiments. As shown in FIG. 10B, on the basis of the above embodiment shown in FIG. 10A, the first analyzing module 92 may include a first analyzing sub-module 921 and a second analyzing sub-module 922.

The first analyzing sub-module 921 is configured to analyze, the PDCCH corresponding to the first PO configured by the first configuration information and being configured to transmit the first paging message, to obtain a paging control information.

The second analyzing sub-module 922 is configured to analyze the PDSCH, corresponding to the first PO configured by the first configuration information and being configured to transmit the first paging message, according to the paging control information obtained by the first analyzing sub-module 921 to obtain the first paging message.

In the embodiments, the PDCCH corresponding to the first PO configured by the first configuration information and being configured to transmit the first paging message may be analyzed to obtain paging control information; and the PDSCH corresponding to the first PO configured by the first configuration information and being configured to transmit the first paging message may be analyzed according to the paging control information to obtain the first paging message.

For example, the UE may analyze the PDCCH 24 corresponding to the first PO 21 in FIG. 2 to obtain the paging control information, and then analyze the PDSCH 25, corresponding to the first PO 21 in FIG. 2 and being configured to transmit the first paging message, according to the paging control information to obtain the first paging message.

In the above embodiments, by analyzing the PDCCH, corresponding to the first PO configured by the first configuration information and being configured to transmit the first paging message, to obtain paging control information, and then analyzing the PDSCH, corresponding to the first PO configured by the first configuration information and being configured to transmit the first paging message, according to the paging control information to obtain the first paging message, the implementation is relatively simple.

Figure 10C:
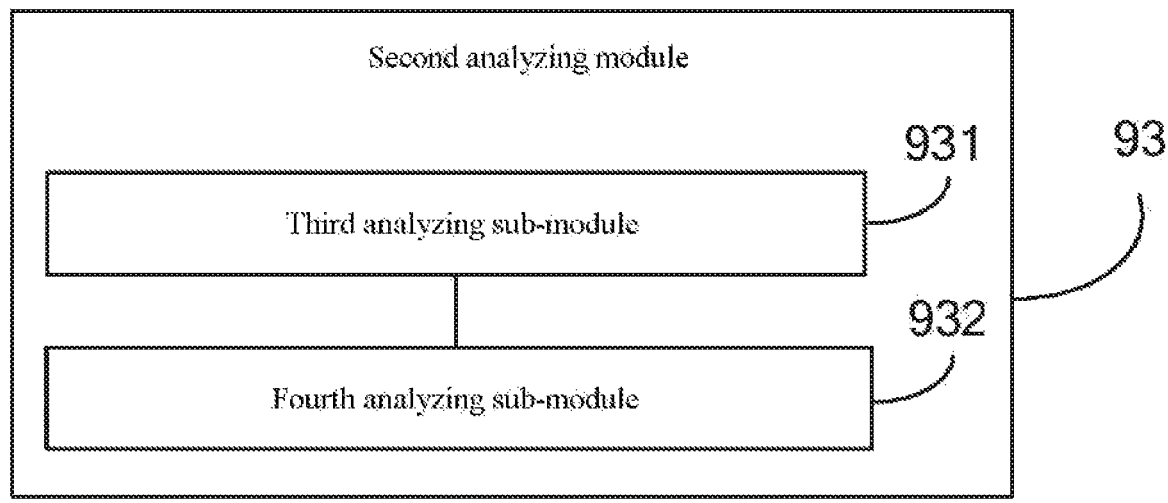
FIG. 10C is a block diagram of another device for receiving a paging message according to some embodiments.

FIG. 10C is a block diagram of another device for receiving a paging message according to some embodiments. As shown in FIG. 10C, on the basis of the above embodiment shown in FIG. 10A, the second analyzing module 93 may include a third analyzing sub-module 931 and a fourth analyzing sub-module 932.

The third analyzing sub-module 931 is configured to analyze the PDCCH, corresponding to the second PO and being configured to transmit the second paging message, to obtain paging control information.

The fourth analyzing sub-module 932 is configured to analyze the PDSCH, corresponding to the second PO and being configured to transmit the second paging message, according to the paging control information obtained by the third analyzing sub-module 931 to obtain the second paging message.

In the embodiments, the PDCCH corresponding to the second PO and being configured to transmit the second paging message may be analyzed to obtain paging control information; and then the PDSCH corresponding to the second PO and being configured to transmit the second paging message may be analyzed according to the paging control information to obtain the second paging message.

For example, the PDCCH 27 corresponding to the second PO 23 in FIG. 2 and being configured to transmit the second paging message is analyzed to obtain the paging control information, and then the PDSCH 28 corresponding to the second PO 23 and being configured to transmit the second paging message is analyzed according to the paging control information to obtain the second paging message.

In the above embodiments, by analyzing the PDCCH, corresponding to the second PO and being configured to transmit the second paging message, to obtain paging control information, and then analyzing the PDSCH, corresponding to the second PO and being configured to transmit the second paging message, according to the paging control information to obtain the second paging message, the implementation is relatively simple.

Figure 11:
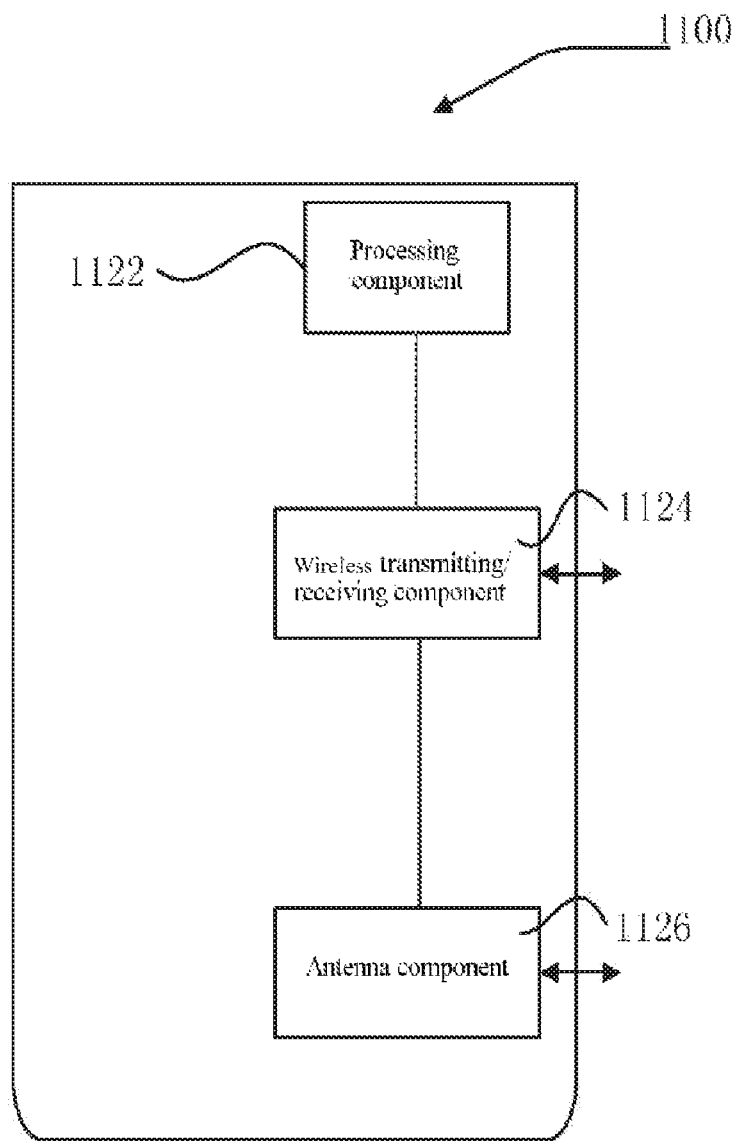
FIG. 11 is a block diagram illustrating a device suitable for sending a paging message according to some embodiments.

FIG. 11 is a block diagram illustrating another device suitable for sending a paging message according to some embodiments. The device 1100 may be provided as a base station. Referring to FIG. 11, the device 1100 includes a processing component 1122, a wireless transmitting/receiving component 1124, an antenna component 1126, and a signal processing portion unique to a wireless interface. The processing component 1122 may further include one or more processors.

One of the processors in the processing component 1122 may be configured to:

determine that a current UE belongs to a first service group or a second service group, if there is a paging request from the current UE, the first service group including a first large service group or a first small service group, and the second service group comprising a second large service group or a second small service group;

send a first paging message to all UEs in the first small service group to which the current UE belongs through one of a plurality of first paging occasions (POs) according to first configuration information which is pre-generated, if the current UE belongs to the first service group; and carry a paging indication through one of the plurality of first POs and send a second paging message to the UE indicated by the paging indication through one second PO according to second configuration information which is pre-generated, if the current UE belongs to the second service group, wherein the paging indication is configured to indicate an identification of all the UEs in the second small service group to which the current UE belongs.

In some embodiments, there is further provided a non-transitory computer-readable storage medium including instructions, and the foregoing instructions may be executed by the processing component 1122 of the device 1100 to implement the foregoing method for sending a paging message. For example, the non-transitory computer-readable storage medium may be a ROM, a random-access memory (RAM), a CD-ROM, a magnetic tape, a floppy disk, an optical data storage device, and the like.

Figure 12:
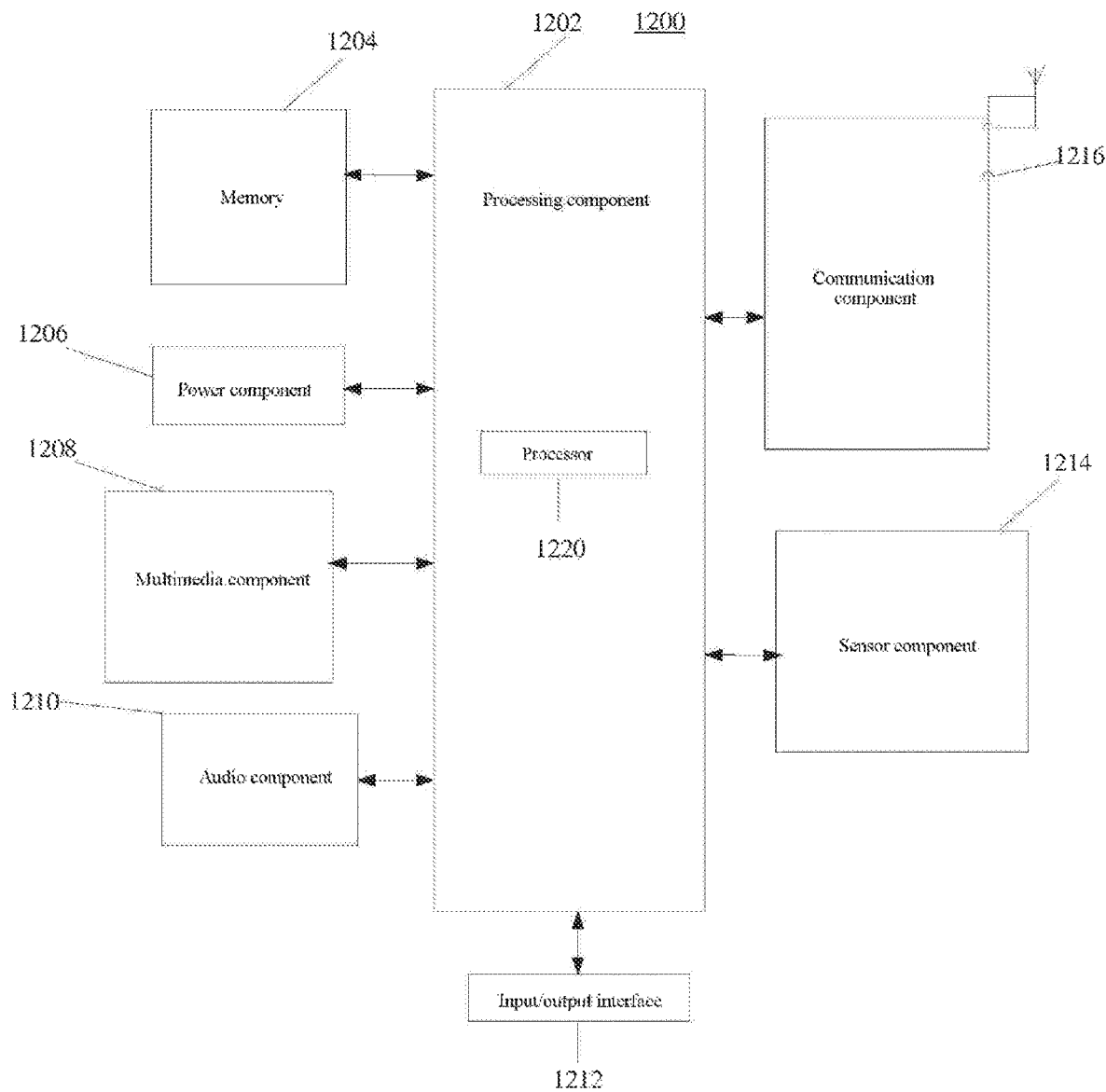
FIG. 12 is a block diagram illustrating a device suitable for receiving a paging message according to some embodiments.

FIG. 12 is a block diagram illustrating a device suitable for receiving a paging message according to some embodiments. For example, the device 1200 may be a user equipment such as a mobile phone, a computer, a digital broadcasting terminal, a messaging device, a game console, a tablet device, a medical device, a fitness device, a personal digital assistant, and the like.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 generally controls overall operations of the device 1200, such as operations associated with display, telephone calls, data communications, camera operations, and recording operations. The processing component 1202 may include one or more processors 1220 to execute instructions to implement all or part of the steps of the foregoing method for receiving a paging message. In addition, the processing component 1202 may include one or more modules to facilitate interaction between the processing component 1202 and other components. For example, the processing component 1202 may include a multimedia module to facilitate the interaction between the multimedia component 1208 and the processing component 1202.

One of the processors 1220 in the processing component 1202 may be configured to:

determine that a current UE belongs to a first service group or a second service group, the first service group including a first large service group or a first small service group, and the second service group including a second large service group or a second small service group;

analyze one of a plurality of first paging occasions (POs) according to first configuration information which is pre-received to obtain a first paging message, if the current UE belongs to the first service group; and analyze second configuration information which is pre-received to obtain a paging indication, and analyze a second PO to obtain a second paging message when an identification of the current UE is located in the identifications of the UE indicated by the paging indication, that is, the identification of the current UE is the same as one of the identifications of the UE indicated by the paging indication, if the current UE belongs to the second service group.

The memory 1204 is configured to store various types of data to support operation of the device 1200. Examples of such data include instructions for any application or method operating on the device 1200, contact data, phone book data, messages, pictures, videos, and the like. The memory 1204 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply assembly 1206 provides power to various components of the device 1200. The power component 1206 may include a power management system, one or more power sources, and other components associated with generating, managing, and distributing power for the device 1200.

The multimedia component 1208 includes a screen that provides an output interface between the device 1200 and a user. In some embodiments, the screen may include a liquid crystal display (LCD) and a touch panel (TP). In some embodiments, the screen may include an organic light-emitting diode (OLED) display or other types of displays.

If the screen includes a touch panel, the screen may be implemented as a touch screen to receive an input signal from a user. The touch panel includes one or more touch sensors to sense touch, swipe, and gestures on the touch panel. The touch sensor can not only sense the boundary of a touch or slide action, but also detect duration and pressure related to the touch or slide operation. In some embodiments, the multimedia component 1208 includes a front camera and/or a rear camera. When the device 1200 is in an operation mode, such as a shooting mode or a video mode, the front camera and/or the rear camera may receive external multimedia data. Each front camera and rear camera may be a fixed optical lens system or have focal length and optical zoom capabilities.

The audio component 1210 is configured to output and/or input audio signals. For example, the audio component 1210 includes a microphone (MIC). When the device 1200 is in an operation mode, such as a call mode, a recording mode, and a voice recognition mode, the microphone is configured to receive an external audio signal. The received audio signal may be further stored in the memory 1204 or transmitted via the communication component 1216. In some embodiments, the audio component 1210 further includes a speaker for outputting audio signals.

The I/O interface 1212 provides an interface between the processing component 1202 and a peripheral interface module. The peripheral interface module may be a keyboard, a click wheel, a button, or the like. These buttons may include, but are not limited to: a home button, a volume button, a start button, and a lock button.

The sensor assembly 1214 includes one or more sensors for providing status evaluation of various aspects of the device 1200. For example, the sensor component 1214 may detect an on/off state of the device 1200, relative positioning of the components (for example, the components are a display and keypad of the device 1200), the sensor component 1214 may also detect the change in the position of the device 1200 or a component of the device 1200, presence or absence of contact of the user with the device 1200, orientation or acceleration/deceleration of the device 1200, and temperature change of the device 1200. The sensor assembly 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may further include an acceleration sensor, a gyroscope sensor, a magnetic sensor, a pressure sensor, or a temperature sensor.

The communication component 1216 is configured to facilitate wired or wireless communication between the device 1200 and other devices. The device 1200 may access a wireless network based on a communication standard, such as Wi-Fi, 2G, 3G, 4G, or 5G, or a combination thereof. In some embodiments, the communication component 1216 receives a broadcast signal or broadcast-related information from an external broadcast management system via a broadcast channel. In some embodiments, the communication component 1216 further includes a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other technologies.

In some embodiments, the device 1200 may be implemented by one or more application-specific integrated circuits (ASICs), a digital signal processor (DSP), a digital signal processing device (DSPD), a programmable logic device (PLD), a field programmable gate array (FPGA), a controller, a microcontroller, a microprocessor, or other electronic components, and is configured to perform the foregoing method for receiving a paging message.

In some embodiments, there is further provided a non-transitory computer-readable storage medium including instructions, such as a memory 1204 including the instructions, and the instructions may be executed by the processor 1220 of the device 1200 to implement the foregoing method. For example, the non-transitory computer-readable storage medium may be a ROM, a random-access memory (RAM), a CD-ROM, a magnetic tape, a floppy disk, an optical data storage device, and the like.

The various device embodiments can correspond to various method embodiments, the relevant parts thereof may refer to the description of the method embodiment. The device embodiments described above are only schematic, wherein the units described as separate components may be or may not be physically separated, and the components shown as units may be or may not be physical units, that is, may be located in one place, or may be distributed across multiple network elements. Some or all of the modules may be selected according to actual needs to achieve the solution of this embodiment. Those of ordinary skill in the art can understand and implement without creative efforts.

Various embodiments of the present disclosure can have one or more of the following advantages.

By sending a first paging message to all UEs in a first small service group to which a current UE belongs through one of a plurality of first paging occasions (POs) according to first configuration information which is pre-generated, and carrying a paging indication through one of the plurality of first POs and sending a second paging message to the UE indicated by the paging indication through one second PO according to second configuration information which is pre-generated, both a low low-latency paging requirement of a low-latency UE and a paging requirement of a non-low-latency UE can be satisfied, and resources can be saved effectively.

When the current UE belongs to a first service group, one of a plurality of first paging occasions (POs) is analyzed according to first configuration information which is pre-received to obtain a first paging message; and when the current UE does not belong to the first service group, second configuration information which is pre-received is analyzed to obtain a paging indication and a second PO is analyzed to obtain a second paging message when an identification of the current UE is located in the identification of the UE indicated by the paging indication, which can save resources effectively.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A method for sending a paging message, which is applied to a base station, comprising:
   determining that a current user equipment (UE) belongs to a first service group or a second service group, in a case where there is a paging request from the current UE, wherein the first service group comprises a first large service group or a first small service group, the second service group comprises a second large service group or a second small service group, and specifically, the first large service group comprises at least one of the first small service group, and the second large service group comprises at least one of the second small service group;
   sending a first paging message to all UEs in the first small service group to which the current UE belongs through one of a plurality of first paging occasions (POs) according to first configuration information which is pre-generated, in a case where the current UE belongs to the first service group; and
   carrying a paging indication through one of the plurality of the first POs and sending a second paging message to the UE indicated by the paging indication through one second PO according to second configuration information which is pre-generated, in a case where the current UE belongs to the second service group, wherein the paging indication is configured to indicate an identification of all the UEs in the second small service group to which the current UE belongs.

2. The method according to claim 1, further comprising, prior to the determining that a current user equipment UE belongs to a first service group or a second service group:
   receiving a first service request sent by the UE, and sending the first service request to a core network; and
   receiving the identification of the UE belonging to the first large service group returned by the core network according to the first service request, and classifying the identification of the UE not belonging to the first large service group to the second large service group.

3. The method according to claim 2, further comprising, after the classifying the identification of the UE not belonging to the first large service group to the second large service group:
   dividing the first large service group into at least one of the first small service group, and dividing the second large service group into at least one of the second small service group.

4. The method according to claim 1, further comprising, prior to the sending a first paging message to all UEs of the first small service group to which the current UE belongs through one of a plurality of first paging occasions (POs) according to first configuration information which is pre-generated:
- generating the first configuration information and the second configuration information, and sending the first configuration information and the second configuration information to the UE,
- wherein the first configuration information comprises one of the plurality of the first POs allocated to the UE belonging to the first service group, and a physical downlink control channel (PDCCH) and a physical downlink shared channel (PDSCH) corresponding to an allocated first PO and being configured to transmit the first paging message, and
- the second configuration information comprises the identification of the first PO for carrying the paging indication, the second PO allocated to the UE belonging to the second service group, and the PDCCH and the PDSCH corresponding to the second PO and being configured to transmit the second paging message.

5. A method for receiving a paging message, which is applied to a user equipment (UE), comprising:
- determining that a current UE belongs to a first service group or a second service group, wherein the first service group comprises a first large service group or a first small service group, and the second service group comprises a second large service group or a second small service group;
- analyzing one of a plurality of first paging occasions (POs) according to first configuration information which is pre-received so as to obtain a first paging message, in a case where the current UE belongs to the first service group; and
- in a case where the current UE belongs to the second service group, analyzing second configuration information which is pre-received, to obtain a paging indication, and analyzing a second PO to obtain a second paging message when an identification of the current UE is the same as one of the identifications of the UE indicated by the paging indication.

6. The method according to claim 5, further comprising:
- receiving the first configuration information and the second configuration information sent by a base station,
- wherein the first configuration information comprises one of the plurality of the first POs allocated to the UE belonging to the first service group, and a physical downlink control channel (PDCCH) and a physical downlink shared channel (PDSCH) corresponding to an allocated first PO and being configured to transmit the first paging message, and
- the second configuration information comprises the identification of the first PO for carrying the paging indication, the second PO allocated to the UE belonging to the second service group, and the PDCCH and the PDSCH corresponding to the second PO and being configured to transmit the second paging message.

7. The method according to claim 6, wherein the analyzing one of a plurality of first paging occasions (POs) according to first configuration information which is pre-received to obtain a first paging message comprises:
- analyzing the PDCCH, corresponding to the first PO configured by the first configuration information and being configured to transmit the first paging message, to obtain paging control information; and
- analyzing the PDSCH, corresponding to the first PO configured by the first configuration information and being configured to transmit the first paging message, according to the paging control information to obtain the first paging message.

8. The method according to claim 6, wherein the analyzing a second PO to obtain a second paging message comprises:
- analyzing the PDCCH, corresponding to the second PO and being configured to transmit the second paging message, to obtain paging control information; and
- analyzing the PDSCH, corresponding to the second PO and being configured to transmit the second paging message, according to the paging control information to obtain the second paging message.

9. A base station implementing the method according to claim 1, comprising:
- a processor; and
- memory having instructions stored thereon for execution by the processor to implement operations of the method.

10. A user equipment implementing the method according to claim 5, comprising:
- a processor; and
- memory having instructions stored thereon for execution by the processor to implement operations of the method.

11. A non-transitory computer-readable storage medium, having computer programs stored thereon for execution by a processor to implement steps of the method according to claim 1.

12. A non-transitory computer-readable storage medium, having computer programs stored thereon for execution by a processor to implement steps of the method according to claim 5.

13. A device for sending a paging message, which is applied to a base station, comprising:
- a processor; and
- memory having instructions stored thereon, that when being executed by the processor, cause the processor to:
- determine that a current user equipment UE belongs to a first service group or a second service group, in a case where there is a paging request from the current UE, wherein the first service group comprises a first large service group or a first small service group, the second service group comprises a second large service group or a second small service group, the first large service group comprises at least one of the first small service group, and the second large service group comprises at least one of the second small service group;
- send a first paging message to all UEs in the first small service group to which the current UE belongs through one of a plurality of first paging occasions (POs) according to first configuration information which is pre-generated, in a case where the current UE belongs to the first service group; and
- carry a paging indication through one of the plurality of the first POs and send a second paging message to the UE indicated by the paging indication through one second PO according to second configuration information which is pre-generated, in a case where the current UE belongs to the second service group, wherein the paging indication is configured to indicate an identification of all the UEs in the second small service group to which the current UE belongs.

14. The device according to claim 13, wherein the processor is further caused to, before determining that a current user equipment UE belongs to a first service group or a second service group:
receive a first service request sent by the UE, and send the first service request to a core network; and
receive the identification of the UE belonging to the first large service group returned by the core network according to the first service request, and classify the identification of the UE not belonging to the first large service group to the second large service group.

15. The device according to claim 14, wherein the processor is further caused to, after classifying the identification of the UE not belonging to the first large service group to the second large service group:
divide the first large service group into at least one of the first small service group, and divide the second large service group into at least one of the second small service group.

16. The device according to claim 13, wherein the processor is further caused to, before sending a first paging message to all UEs of the first small service group to which the current UE belongs through one of a plurality of first paging occasions (POs) according to first configuration information which is pre-generated:
generate the first configuration information and the second configuration information, and send the first configuration information and the second configuration information to the UE,
wherein the first configuration information comprises one of the plurality of the first POs allocated to the UE belonging to the first service group, and a physical downlink control channel (PDCCH) and a physical downlink shared channel (PDSCH) corresponding to an allocated first PO and being configured to transmit the first paging message, and
the second configuration information comprises the identification of the first PO for carrying the paging indication, the second PO allocated to the UE belonging to the second service group, and the PDCCH and the PDSCH corresponding to the second PO and being configured to transmit the second paging message.

17. A device for receiving a paging message implementing the method according to claim 5, which is applied to a user equipment, comprising:
a processor; and
memory having instructions stored thereon for execution by the processor to implement operations of the method.

18. A communication system implementing the method according to claim 1, comprising the base station, wherein the base station is configured to satisfy both a low low-latency paging requirement of a low-latency UE, and a paging requirement of a non-low-latency UE, to thereby effectively save resources.

19. The communication system of claim 18, further comprising the current UE, wherein
in a case that the current UE belongs to the first service group, one of a plurality of first POs is analyzed according to first configuration information which is pre-received to obtain a first paging message; and
in a case that the current UE does not belong to the first service group, second configuration information which is pre-received is analyzed to obtain a paging indication and a second PO is analyzed to obtain a second paging message when an identification of the current UE is located in the identification of the UE indicated by the paging indication.

* * * * *